US012469381B2

(12) United States Patent
Swift et al.

(10) Patent No.: US 12,469,381 B2
(45) Date of Patent: Nov. 11, 2025

(54) INDUSTRIAL DEVICE TO PERSONAL PROTECTIVE EQUIPMENT ALERT DELIVERY

(71) Applicant: 3M INNOVATIVE PROPERTIES COMPANY, St. Paul, MN (US)

(72) Inventors: Brian J. Swift, Woodbury, MN (US); Gary R. Stephany, Stillwater, MN (US); Michael G. Wurm, Waukesha, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 54 days.

(21) Appl. No.: 17/755,933

(22) PCT Filed: Nov. 16, 2020

(86) PCT No.: PCT/IB2020/060783
§ 371 (c)(1),
(2) Date: May 12, 2022

(87) PCT Pub. No.: WO2021/099920
PCT Pub. Date: May 27, 2021

(65) Prior Publication Data
US 2022/0383730 A1 Dec. 1, 2022

Related U.S. Application Data

(60) Provisional application No. 62/937,436, filed on Nov. 19, 2019.

(51) Int. Cl.
*G08C 17/02* (2006.01)
*G08B 21/02* (2006.01)

(52) U.S. Cl.
CPC ............ *G08C 17/02* (2013.01); *G08B 21/02* (2013.01); *G08C 2201/42* (2013.01)

(58) Field of Classification Search
CPC ..... G08C 17/02; G08C 2201/42; G08B 21/02
(Continued)

(56) References Cited

U.S. PATENT DOCUMENTS 4,322,842 A 3/1982 Martinez
7,050,893 B2 5/2006 Watanabe et al.
(Continued)

FOREIGN PATENT DOCUMENTS

WO 2018071568 A1 4/2018
WO 2019051349 A1 3/2019
WO 2019244125 A3 12/2019

OTHER PUBLICATIONS

A simple Bluetooth—WiFi Gateway (IGS01), Feb. 2017, [retrieved from the internet on May 16, 2019], URL<https://f.ruuvi.com/t/a-simple-bluetooth-wifi-gateway-igs01/120>, 7 pages.
Axiomware Netrunr Bluetooth Gateway, URL<https://www.axiomware.com/>, 3 pages.
Fanstel, Open-Source WIFI to Bluetooth 5, Thread, Zigbee Industrial IoT Gateway, URL<https://www.fanstel.com/wifi-ble-5-iot-gateway>, 10 pages.
(Continued)

*Primary Examiner* — Naomi J Small
(74) *Attorney, Agent, or Firm* — Sriram Srinivasan

(57) ABSTRACT

A system includes an article of personal protective equipment (PPE) and an industrial controller device configured to control an industrial device. The system includes a first computing device and a second computing device. The first computing device, in response to detecting an industrial controller event, wirelessly broadcasts an event message that solicits an action from a worker. The second computing device, in response to receiving the event message, generates an output that solicits the action from the worker, and in response to detecting a user input associated with the article of PPE, send, a response from the second computing device to the first computing device. The first computing device, in response to receiving the response from the second computing device, performs at least one operation associated with the industrial controller device.

21 Claims, 4 Drawing Sheets

(58) Field of Classification Search
USPC ..................................................... 340/12.22
See application file for complete search history.

(56) References Cited

U.S. PATENT DOCUMENTS

| | | | |
|---|---|---|---|
| 7,468,661 B2 | 12/2008 | Petite et al. | |
| 8,275,576 B2 | 9/2012 | Furem et al. | |
| 11,495,140 B2* | 11/2022 | Becker | G09B 19/24 |
| 2009/0276930 A1* | 11/2009 | Becker | B23K 9/0956 |
| | | | 2/8.2 |
| 2011/0022442 A1 | 1/2011 | Wellman et al. | |
| 2014/0346158 A1* | 11/2014 | Matthews | A61F 9/06 |
| | | | 434/234 |
| 2017/0224536 A1* | 8/2017 | Sernfalt | A61F 9/061 |
| 2017/0303187 A1 | 10/2017 | Crouthamel et al. | |
| 2018/0072223 A1 | 3/2018 | Arunachalam et al. | |
| 2020/0311853 A1* | 10/2020 | Falde | B23K 31/02 |

OTHER PUBLICATIONS

International Search Report for PCT International Application No. PCT/IB20/60783, mailed on Mar. 25, 2021, 3 pages.

Ovrebekk, "The Bluetooth 5 trade-off", NORDIC Semiconductor, Jul. 2017, [retrieved from the internet on May 16, 2019], URL<https://blog.nordicsemi.com/getconnected/the-bluetooth-5-trade-off>, 3 pages.

Sponas, "Things You Should Know About Bluetooth Range", NORDIC Semiconductor, Feb. 2018, [retrieved from the internet on May 16, 2019], URL<https://blog.nordicsemi.com/getconnected/things-you-should-know-about-bluetooth-range>, 8 pages.

Voice and Sound Module, Latin Tech, 2005, [retrieved from the internet on May 9, 2019], URL <http://www.it-automation.com/VoiceModule.htm>, 2 pages.

Extended European Search Report, EP20889346.1, dated Nov. 22, 2023, 3 pages.

* cited by examiner

INDUSTRIAL DEVICE TO PERSONAL PROTECTIVE EQUIPMENT ALERT DELIVERY

CROSS REFERENCE TO RELATED APPLICATIONS

This application is a national stage filing under 35 U.S.C. 371 of PCT/IB2020/060783, filed Nov. 16, 2020, which claims the benefit of U.S. Provisional Application No. 62/937,436, filed Nov. 19, 2019, the disclosure of which is incorporated by reference in its/their entirety herein.

TECHNICAL FIELD

The present disclosure relates to the field of personal protective equipment. More specifically, the present disclosure relates to an article of personal protective equipment and industrial devices.

BACKGROUND

Personal protective equipment (PPE) may be used to protect a user (e.g., a worker) from harm or injury from a variety of causes in a work environment. For example, fall protection equipment is important safety equipment for workers operating at potentially harmful or even deadly heights. To help ensure safety in the event of a fall, workers often wear safety harnesses connected to support structures with fall protection equipment such as lanyards, energy absorbers, self-retracting lifelines (SRLs), descenders, and the like. As another example, when working in areas where there is known to be, or there is a potential of there being dusts, fumes, vapors, gases or other contaminants that are potentially hazardous or harmful to health, it is common for a worker to use an air purifying respirator or in some cases, a supplied air respirator. While a large variety of respiratory protection devices are available, some commonly used devices include powered air purifying respirators (PAPR) and a self-contained breathing apparatus (SCBA). Other PPE include those for hearing protection (ear plugs, earmuffs), vision protection (safety spectacles, goggles, welding shields or other face shields), head protection (e.g., helmets, hard hats, or the like), and protective clothing. In some instances, a user may operate in a work environment with multiple different articles of personal protective equipment.

The work environment may further include one or more industrial devices. Examples of industrial devices may include conveyors, drives and drive systems, motors, mixers, reactors, robotic devices, control systems, presses, stamps, heating or cooling elements, light sources, drilling devices, etching, devices, printing devices, ventilation devices, and sensing devices, to name only a few examples. Such industrial devices may pose safety hazards to workers.

SUMMARY

In one aspect, a system is described. The system includes an article of personal protective equipment (PPE) and an industrial controller device that is configured to control an industrial device. The system further includes a first computing device communicatively coupled to the industrial controller device and including a first computer processor and a first memory. The system includes a second computing device communicatively coupled to the article of PPE and including a second computer processor and a second memory. The first memory includes at least one first instruction that, when executed by the first computer processor, causes the first computer processor to, in response to detecting an industrial controller event that corresponds to the industrial device, wirelessly broadcast an event message, based at least in part on the industrial controller event, that solicits an action from a worker. The second memory includes at least one second instruction that, when executed by the second computer processor, causes the second computer processor to, in response to receiving the event message that is wirelessly broadcasted, generate an output for the worker associated with the article of PPE that solicits the action from the worker, and in response to detecting a user input associated with the article of PPE, send, based at least in part on the event message and the user input, a response from the second computing device to the first computing device. Further, the first memory includes at least one third instruction that, when executed by the first computer processor, causes the first computer processor to, in response to receiving the response from the second computing device, perform at least one operation associated with the industrial controller device.

In another aspect, an article of personal protective equipment (PPE) associated with a worker is described. The article of PPE includes a user interface configured to receive a user input from the worker, a communication module communicatively coupled to the user interface, and a processing module communicatively coupled to the communication module and the user interface. The communication module is configured to receive an event message wirelessly broadcasted from a first computing device that is communicatively coupled to an industrial controller device. The industrial controller device is configured to control an industrial device. The event message is associated with an industrial controller event that corresponds to the industrial device and the event message solicits an action from the worker. The processing module is configured to generate an output for the worker associated with the article of PPE in response to receiving the event message and detect the user input on the user interface from the worker in response to the output. The communication module is further configured to send, based at least in part on the event message and the user input, a response to the first computing device. The first computing device, in response to receiving the response, performs at least one operation associated with the industrial controller device.

In a further aspect, a method is described. The method includes receiving, by a second computing device communicatively coupled to an article of personal protective equipment (PPE), an event message wirelessly broadcasted from a first computing device. The first computing device is communicatively coupled to an industrial controller device that is configured to control an industrial device. The event message is associated with an industrial controller event that corresponds to the industrial device, and the event message solicits an action from a worker associated with the article of PPE. The method further includes generating, by the second computing device, an output for the worker associated with the article of PPE that solicits the action from the worker. The method further includes detecting, by the second computing device, a user input associated with the article of PPE, and sending, by the second computing device, based at least in part on the event message and the user input, a response to the first computing device. The first computing device, in response to receiving the response, performs at least one operation associated with the industrial controller device.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The disclosure may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various examples are shown by way of illustration. It is to be understood that other examples are contemplated and may be made without departing from the scope or spirit of the present disclosure. The following detailed description, therefore, is not to be taken in a limiting sense.

Figure 1:
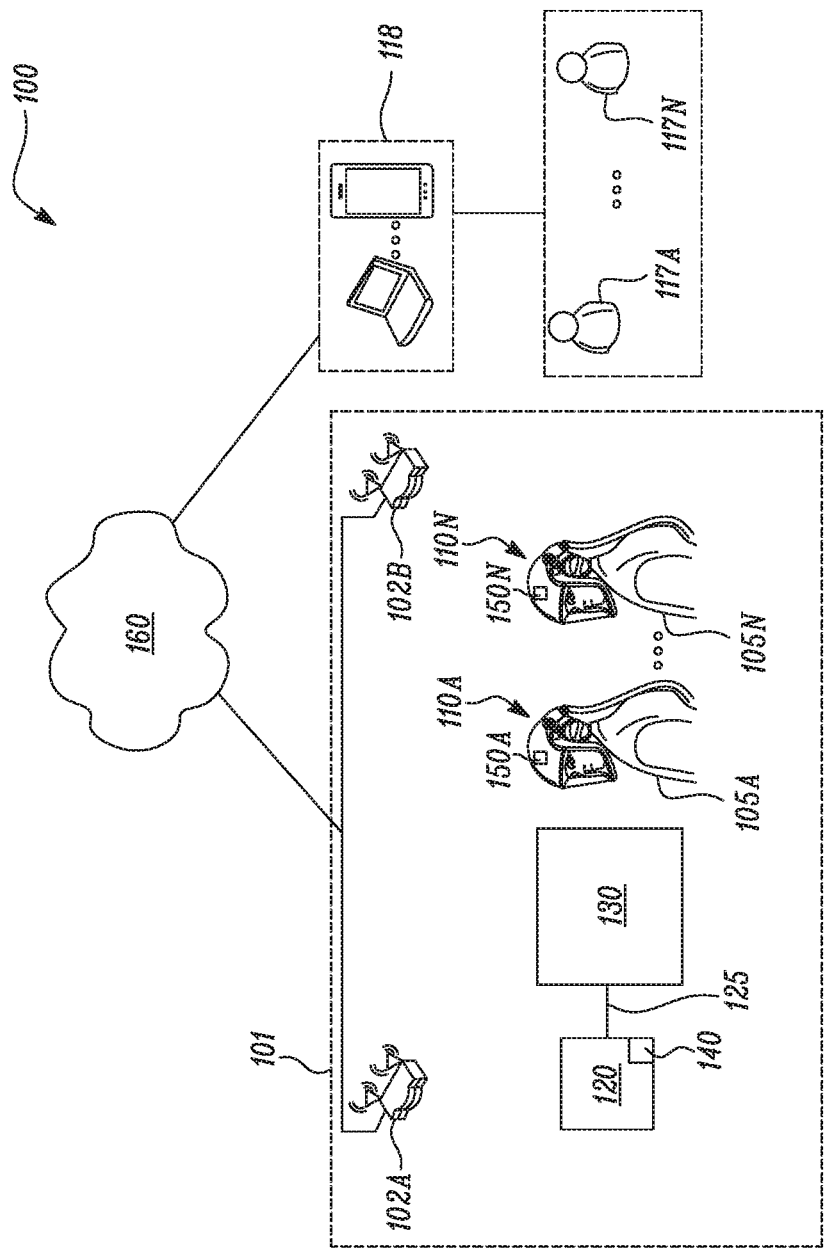
FIG. 1 is a block diagram illustrating an example system including an article of personal protective equipment (PPE), an industrial controller device that is configured to control an industrial device, a first computing device communicatively coupled to the industrial controller device, and a second computing device communicatively coupled to the article of PPE, in accordance with techniques of this disclosure.

FIG. 1 is a block diagram illustrating an example system 100 including articles of personal protective equipment (PPE) 110A-110N (collectively, article of PPEs 110), an industrial controller device 120 that is configured to control an industrial device 130, a first computing device 140 communicatively coupled to the industrial controller device 120, and second computing devices 150A-150N (collectively, second computing devices 150) communicatively coupled to the article of PPE 110, in accordance with techniques of this disclosure. FIG. 1 illustrates the second computing device 150 integrated within the article of PPE 110. However, in some other examples, the second computing device 150 may not be integrated within the article of PPE 110.

The article of PPE 110 may be used to protect workers 105A-105N (collectively, workers 105) from harm or injury from a variety of causes in an environment 101. The environment 101 may be construction sites, mining or manufacturing sites or any physical environment. One or more individuals, such as the workers 105, utilize the article of PPE 110 while engaging in tasks or activities within the environment 101. The article of PPE 110 is associated with the worker 105. Examples of the article of PPE 110 include, but are not limited to respiratory protection equipment (including disposable respirators, reusable respirators, powered air purifying respirators, and supplied air respirators), protective eyewear, such as visors, goggles, filters or shields (any of which may include augmented reality functionality), protective headwear, such as hard hats, hoods or helmets, hearing protection (including ear plugs and ear muffs), protective shoes, protective gloves, other protective clothing, such as coveralls and aprons, protective articles, such as sensors, safety tools, detectors, global positioning devices, mining cap lamps, fall protection harnesses, exoskeletons, self-retracting lifelines, heating and cooling systems, gas detectors, and any other suitable gear.

As shown in FIG. 1, the environment 101 may include the industrial device 130 and the industrial controller device 120. The industrial device 130 may be any physical device that performs an automated operation and is implemented with one or more of electrical, digital, mechanical, optical, and/or chemical technologies, to name only a few example technologies. The industrial device 130 may represent a combination of multiple other industrial devices. Examples of industrial devices 130 may include but are not limited to: conveyors, drives and drive systems, motors, mixers, reactors, robotic devices, control systems, presses, stamps, heating or cooling elements, light sources, drilling devices, etching, devices, printing devices, ventilation devices, and sensing devices, to name only a few examples. Industrial devices 130 may also include combinations of such multiple industrial devices in a factory automation line, station area, or other grouping or assembly of multiple industrial devices.

The industrial device 130 may be controlled by the industrial controller device 120. In some examples, the industrial device 130 may be communicatively coupled to the industrial controller device 120. For instance, a communication link 125 may be a physical or a virtual communication channel between the industrial controller device 120 and the industrial device 130. In some examples, the communication link 125 may represent several wired and/or wireless links, and in some examples, other communication devices (e.g., routers, switches, hubs) that communicatively couple together to form a communication channel between the industrial controller device 120 and the industrial device 130. In some examples, the communication link 125 may represent one or more networks and/or direct connections. As shown in FIG. 1, the first computing device 140 may be integrated within the industrial controller device 120. In some other examples, the first computing device 140 may not be integrated in the industrial controller device 120.

The industrial controller device 120 may be any device that controls, changes, monitors, or otherwise manages the industrial device 130. Examples of the industrial controller device 120 may include but are not limited to: programmable logic controllers (PLC), I/O (input/output) devices that facilitate communication between other industrial controller devices or sub-components, motor control centers (MCC), drive control devices, manufacturing execution systems (MES), portable computer systems (e.g., desktop and mobile devices), and servers, to name only a few examples. The industrial controller device 120 may perform sequential relay control, motion control, process control, distributed control systems, analytics, monitoring, sensing, user interfacing, and networking, to name only a few example operations.

The industrial controller device 120 may generate, send, and/or receive industrial controller data based on the operation of the industrial controller device 120 and/or the industrial device 130. Examples of industrial controller data include, but are not limited to: device operating state (normal, abnormal, on, off, locked, unlocked, etc.); temperature; load; weight; rate; component position (e.g., a position of a component of the industrial controller device 120); timestamp information; user/worker/operator information; properties of materials being processed, measured or otherwise included as part of a process operated by the industrial controller device 120.

In addition, the environment 101 includes a plurality of wireless access points 102A, 102B that may be geographically distributed throughout the environment 101 to provide support for wireless communications throughout the environment 101.

In some examples, the first computing device 140 communicates with remote computing devices 118 via one or more computer networks 160. In some examples, the second computing device 150 may also communicate with remote computing devices 118 via the one or more computer networks 160. In some examples, each of the remote computing devices 118 may be associated with each of the remote users 117A-117N (collectively, remote users 117). In some examples, the remote users 117 may be individuals not working in the environment 101. In some examples, the remote users 117 may include an owner of a work environment, responsible supervisor and/or safety manager for a work environment.

According to aspects of this disclosure, system 100 includes an article of personal protective equipment (PPE) 110A, an industrial controller device 120 that is configured to control an industrial device 130, a first computing device 140 communicatively coupled to the industrial controller device 120 and a second computing device 150A communicatively or operably or physically coupled to the article of PPE 150A. The first computing device 140, in response to detecting an industrial controller event that corresponds to the industrial device 130, wirelessly broadcasts an event message. The event message, based at least in part on the industrial controller event, solicits an action from a worker 105A. The second computing device 150A, in response to receiving the event message that is wirelessly broadcasted, generates an output for the worker 105A associated with the article of PPE 110A that solicits the action from the worker 105A. The second computing device 150A, in response to detecting a user input associated with the article of PPE 110A, sends, a response from the second computing device 150A to the first computing device 140. The response is based at least in part on the event message and the user input. The first computing device 140, in response to receiving the response from the second computing device 150A, performs at least one operation associated with the industrial controller device 120.

Figure 2:
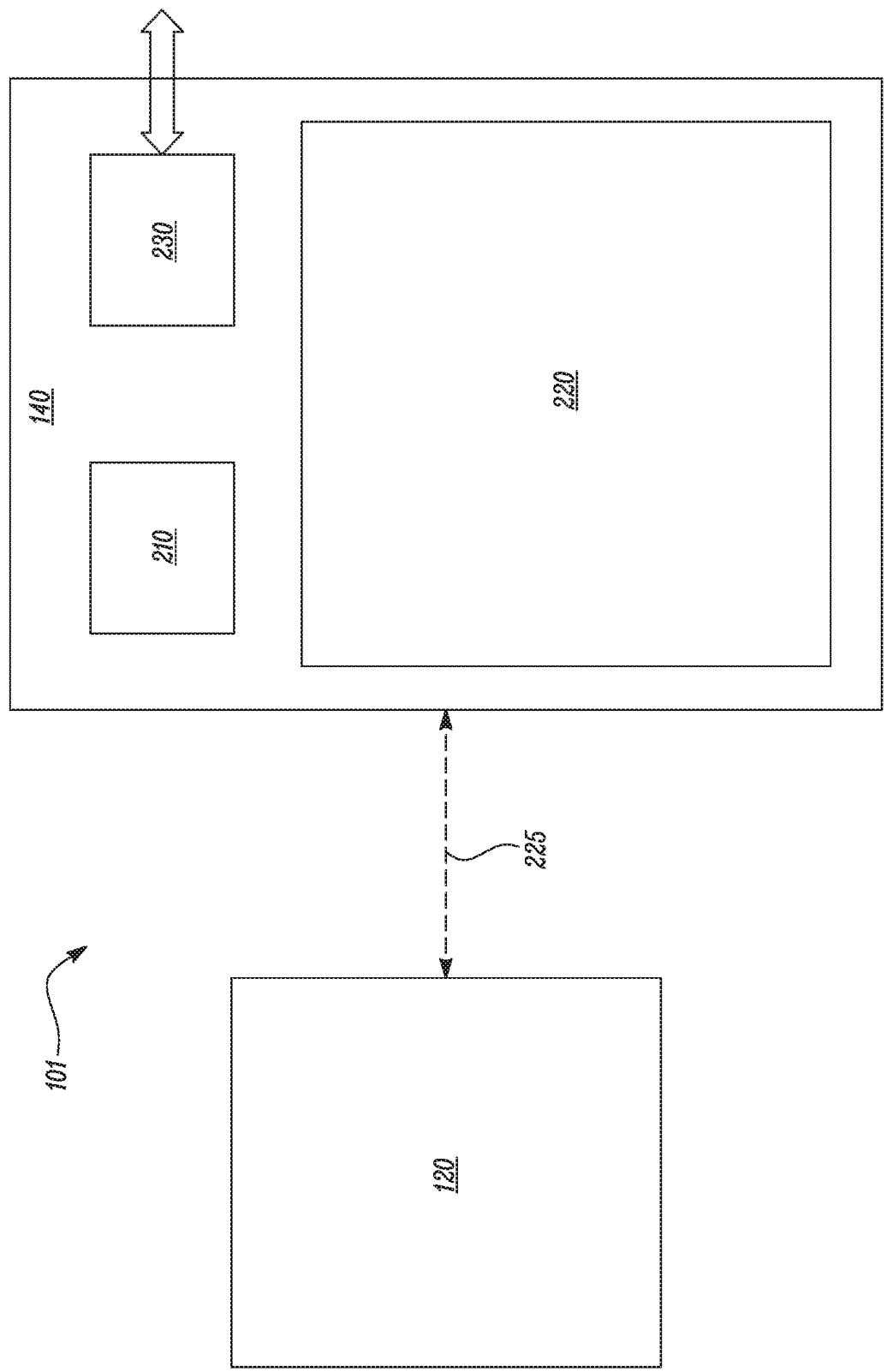
FIG. 2 illustrates the first computing device that is communicatively coupled to the industrial controller device, in accordance with techniques of this disclosure.

FIG. 2 illustrates the first computing device 140 that is communicatively coupled to the industrial controller device 120, in accordance with techniques of this disclosure. As shown in FIG. 2, the first computing device 140 may not be integrated in the industrial controller device 120. In some examples, the first computing device 140 may be mounted/positioned in a stationary manner from a floor, wall, ceiling, or other supporting surface of the environment 101 or objects within the environment 101. The first computing device 140 is communicably coupled to the industrial controller device 120. In some examples, a communication link 225 between the first computing device 140 and the industrial controller device 120 may be a physical or a virtual communication channel between the industrial controller device 120 and the industrial device 130. In some examples, the communication link 225 may represent several wired and/or wireless links, and in some examples, other communication devices (e.g., routers, switches, hubs) that communicatively couple together to form a communication channel between the first computing device 140 and the industrial controller device 120. In some examples, the communication link 225 may represent one or more networks and/or direct connections.

The first computing device 140 includes a first computer processor 210 and a first memory 220. In some examples, the first computing device 140 includes a communication module 230 communicatively coupled to the industrial controller device 120 and/or one or more other computing devices (e.g., a second computing device or remote computing device). The communication module 230 is configured to wirelessly broadcast an event message from the first computing device 140. In some examples, communication methods such as Wi-Fi, WiMax, cellular communication (3G, 4G, LTE, 5G), communication over private licensed bands, etc., can be utilized. In some examples, the first computing device 140 may include a subset of components or may include additional components. The first memory 220 stores one or more instructions that are executed by the first computer processor 210. The first memory 220 includes at least one first instruction that, when executed by the first computer processor 210, causes the first computer processor 210 to wirelessly broadcast the event message in response to detecting an industrial controller event that corresponds to the industrial device 130 (shown in FIG. 1). In some examples, the first computing device 140 provides real-time broadcast of the event message in response to detecting the industrial controller event. In some examples, the first computing device 140 may deliver one or more alerts associated with the industrial controller event to the second computing device 150.

In some examples, the industrial controller device 120 wirelessly broadcasts the event message in response to detecting an industrial controller event that corresponds to the industrial device 130.

In some examples, the industrial controller event may refer to a condition of the industrial device 130, or the industrial controller device 120 (e.g., which may be hazardous). In some examples, the industrial controller event may be an indication of an unsafe condition. In some examples, the industrial controller event represents a state outside of a set of defined thresholds, rules, or other limits configured by a human operator and/or are machine-generated. In some examples, the industrial controller event may indicate temperature, output rate, vibration, sound emission, component speed, operating rate, air or sound hazard level, radiation level, or any other metric that may not satisfy or may not be within one or more rules, limits, or thresholds.

The event message is based at least in part on the industrial controller event. In some examples, the event message includes at least one of an audible indication, a visual indication, and a tactile indication. For example, the article of PPE 110 (shown in FIG. 1) may include one or more devices to generate audible indication (e.g., one or more speakers), visual indication (e.g., one or more displays, light emitting diodes (LEDs) or the like), or tactile indication (e.g., a device that vibrates or provides other haptic feedback). In some examples, the event message may be an alert for the worker 105. In some examples, the event message further includes one or more instructions for the worker 105. The instructions may provide guidance to the worker for responding to the event message. In some examples, the event message may include instructions for the worker 105 to leave the environment 101. In some examples, the event message may include instructions for the worker 105 to replace one or more components of the industrial device 130 and/or the industrial controller device 120. In some examples, the event message may include instructions for the worker 105 to stop the industrial device 130.

In some other examples, the event message is wirelessly broadcasted in a dedicated virtual channel for non-audio messaging. The virtual channel is included in a set of virtual channels and the set of virtual channels are each included in a single physical channel. In some examples, the event message is sent by the second computing device 150A to a third computing device 150N that is communicatively coupled to another article of PPE 110N (shown in FIG. 1). The third computing device 150N is within a range of the second computing device 150A but not in direct communication with the first computing device 140. For example, the third computing device 150N is within a range of the second computing device 150A but not in a range of the first computing device 140. In some examples, the second computing device 150A and/or the third computing device 150N are not in direct communication with the first computing device 140. In these examples, one or more wireless access points 102A, 102B (shown in FIG. 1), geographically distributed throughout the environment 101, may be configured to extend the range of the wireless communication by amplifying the signal corresponding to the event message. The event message from the first computing device 140 may be forwarded by one or more wireless access points 102A, 102B before delivery to the second computing device 150A and/or the third computing device 150N.

In some examples, the event message includes at least one of a worker group identifier and a message identifier. In some examples, the worker group identifier may correspond to a worker group in a work zone that includes the industrial device 130. The work zone may include a region encompassed by a defined boundary. In some examples, the defined boundary may be represented in data with coordinates, perimeters, or other indicia of the boundary. In some examples, the worker group identifier may correspond to type of worker, role of worker, or any other data that describes or characterizes a worker. In some examples, the message identifier may correspond to type of industrial controller event. In some examples, the first computing device 140 multicasts the event message to multiple articles of PPEs that are subscribed to a particular group. In some examples, a multicasting server may prioritize the event messages based on the message identifier. In some examples, the event message includes a time stamp or any other information related to the industrial controller event. In some examples, multicasting the event message to a particular group may lower distractions. In some examples, multicasting the event message to a particular group may ensure the workers receive only relevant messages. This may avoid distractions and avoid irrelevant alerts.

The event message solicits an action from the worker 105 (shown in FIG. 1) and is receivable by any other computing devices within wireless range of the first computing device 140. In some examples, the event message solicits an acknowledgement from the worker 105.

Figure 3:
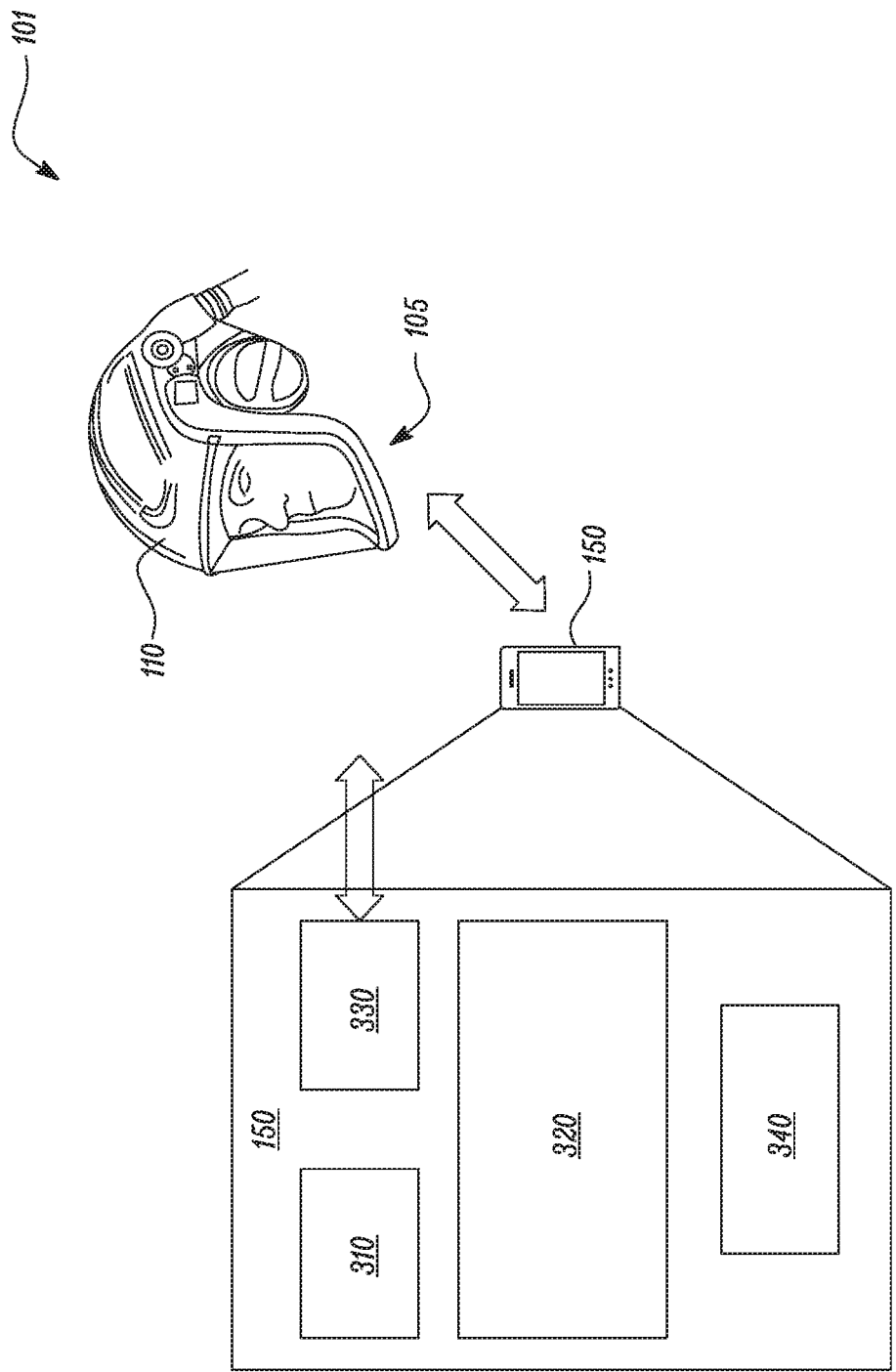
FIG. 3 illustrates the second computing device and the article of personal protective equipment, in accordance with techniques of this disclosure.

FIG. 3 illustrates the second computing device 150 and the article of PPE 110, in accordance with techniques of this disclosure. The article of PPE 110 is communicatively coupled to the second computing device 150. As shown in FIG. 3, the second computing device 150 is not integrated within the article of PPE 110. In some other examples, the second computing device 150 is worn by the worker 105 associated with the article of PPE 110. In some examples, the second computing device 150 may be portable such that it can be carried by the worker 105. In some examples, the second computing device 150 may also be personal, such that it is used by an individual and communicates with an article of PPE assigned to that individual. In some examples, the second computing device 150 may be secured to the worker 105 by a strap. However, the second computing device 150 may be secured to the worker 105 in other ways, such as being secured to the article of PPE 110 being worn by the worker 105, to other garments being worn by the worker 105, being carried in a pocket or attached to a belt, band, buckle, clip or other attachment mechanism as will be apparent to one of skill in the art upon reading the present disclosure.

In some examples, the second computing device 150 may be an intrinsically safe computing device, smartphone, wrist- or head-wearable computing device, or any other computing device that may include a set, subset, or superset of functionality or components in the second computing device 150. In some examples, the second computing device 150 may also include a power source, such as a battery, to provide power to components in the second computing device 150. A rechargeable battery, such as a Lithium Ion battery, can provide a compact and long-life source of power.

As shown in FIG. 3, the second computing device 150 includes a second computer processor 310 (interchangeably referred to as "the processing module 310") and a second memory 320. In some examples, the second computing device 150 may include a subset of the components or may include additional components. The second memory 320 is configured to store at least one second instruction. The at least one second instruction, when executed by the second computer processor 310, causes the second computer processor 310 to generate an output for the worker 105, associated with the article of PPE 110, that solicits the action from the worker 105 in response to receiving the event message that is wirelessly broadcasted. In some examples, the second computing device 150 may be configured to include one or more electronic components for outputting communication to the worker 105, such as speakers, vibration devices, LEDs, buzzers or other devices for outputting alerts, audio or visual messages, sounds, indicators and the like. In some examples, the duration or intensity of the output may be based on severity of the industrial controller event. In some examples, the output may be repeatedly provided after fixed intervals.

The at least one second instruction further causes the second computer processor 310 to send a response from the second computing device 150 to the first computing device 140 in response to detecting a user input associated with the article of PPE 110.

In some examples, the second computing device 150 may include a button or any other input device (for example, touch input on a touch-enabled device) through which the worker 105 may provide the user input.

In some examples, the worker 105 may provide voice commands as user input. For instance, worker 105 may provide voice commands to the second computing device 150. A voice command component may perform natural language processing or other recognition techniques on audible sounds received from worker 105. Based on the processing of the audible sounds, the voice command component may perform one or more operations. For instance, the voice command component may send a message to one or more devices, change the operation of one or more device, or send the audible sounds to one or more other devices, to name only a few example operations that may be performed by the voice command component in response to receiving the audible sources.

Referring to FIGS. 2 and 3, the first memory 220 further includes at least one third instruction. The at least one third instruction, when executed by the first computer processor 210, causes the first computer processor 210 to perform at least one operation associated with the industrial controller device 120 in response to receiving the response from the second computing device 150. The response is based at least in part on the event message and the user input. In some examples, the industrial controller device 120 stops the operation of the industrial device 130. In some examples, the industrial controller device 120 modifies the speed of operation of the industrial device 130. In some examples, the industrial controller device 120 changes the operation of the industrial device 130. In some examples, the industrial controller device 120 changes a position of a component of the industrial device 130.

The second computing device 150 includes a user interface 340 configured to receive the user input from the worker 105. Examples of user input are tactile, audio, kinetic, and optical input, to name only a few examples. The user interface 340 of the second computing device 150, in one example, include a mouse, keyboard, voice responsive system, video camera, buttons, control pad, microphone or any other type of device for detecting input from a worker. In some examples, the user interface 340 may be a presence-sensitive input component, which may include a presence-sensitive screen, touch-sensitive screen, etc.

In some examples, the user interface 340 may be configured for outputting communication to the worker 105. In some examples, the user interface 340 may provide one or more of data, tactile, audio, and video output. Output components of the user interface 340, in some examples, include a presence-sensitive screen, sound card, video graphics adapter card, speaker, cathode ray tube (CRT) monitor, liquid crystal display (LCD), or any other type of device for generating output to a human or machine. The output components may include display components such as cathode ray tube (CRT) monitor, liquid crystal display (LCD), Light-Emitting Diode (LED) or any other type of device for generating tactile, audio, and/or visual output. In some other examples, the second computing device 150 may be configured to include one or more electronic components for outputting communication to the respective worker, such as speakers, vibration devices, LEDs, buzzers or other devices for outputting alerts, audio or visual messages, sounds, indicators and the like.

In some examples, the second computing device 150 includes a communication module 330 communicatively is coupled to the user interface 340. The communication module 330 is configured to receive the event message wirelessly broadcasted from the first computing device 140 that is communicatively coupled to the industrial controller device 120. The event message is associated with the industrial controller event that corresponds to the industrial device 130 (shown in FIG. 1). In some examples, the event message is sent to a remote article of PPE 110N that is within a range of the article of PPE 110A but not in direct communication with first computing device 140. In some examples, the article of PPE 110A and the remote article of PPE 110N are not in direct communication with the first computing device 140. In these examples, the plurality of wireless access points 102A, 102B (shown in FIG. 1), geographically distributed throughout the environment 101, may receive the event message from the first computing device 140 and send the event message to the article of PPE 110A and/or remote article of PPE 110N. The event message solicits an action from the worker 105. In some examples, the event message solicits an acknowledgement from the worker 105. In some examples, the duration or intensity of the output may be based on severity of the industrial controller event.

In some examples, the worker 105 may be able to mute or snooze the output. In some examples, the worker 105 may long press to provide the acknowledgement.

The communication module 330 is further configured to send the response to the first computing device 140 based at least in part on the event message and the user input. In some examples, the communication module 330 is configured to wirelessly communicate with the first computing device 140 using at least one of Bluetooth, cellular communications network, and Wi-Fi. The cellular network may be one or more of GSM, GPRS, 3G, EVDO, LTE, 4G, 5G, mesh, or other network. The industrial controller device 120 performs the at least one operation associated with the industrial controller device 120 in response to receiving the response from the communication module 330.

In some examples, the first computing device 140 clears the industrial controller event if the worker 105 provides the user input. In some examples, the first computing device 140 clears the industrial controller event if the worker 105 provides the user input within a threshold period of time. In some examples, the first computing device 140 clears the industrial controller event upon receiving an acknowledgement from the worker. In some other examples, the first computing device 140 clears the industrial controller event if another worker provides the user input.

In some examples, the first computing device 140 may resend the event message if the worker 105 does not provide the user input within the threshold period of time. In some examples, the first computing device 140 escalates the industrial controller event if the worker 105 does not provide the user input within the threshold period of time. For example, if the worker 105 does not provide the user input within the threshold period of time, the first computing device 140 and/or second computing device 150 may notify an owner or administrator of a work environment, responsible supervisor and/or safety manager for a work environment. In some examples, the first computing device 140 may communicate with remote computing devices 118 via one or more computer networks 160 to notify the remote users 117 (shown in FIG. 1). In some examples, the remote users 117 may be individuals not working in the environment 101. In some examples, to escalate the event, a computing device may change the type or duration of the notification, alert, or other output that corresponds to the event. For instance, the intensity; modality (e.g., haptic, audible, visual); combination of notification, alert, or other output(s); time between notification, alert, or other output(s); or any other properties of the notification, alert, or other output(s) may be modified to increase the likelihood of obtaining the user's attention and/or obtaining the solicited feedback or input from the user.

In some examples, the first computing device 140 may send the event message to a group of workers 105 with a different a worker group identifier if the worker 105 does not provide the user input within the threshold period of time. In some examples, the first computing device 140 may disable the industrial controller 120 and/or industrial device 130 if the worker 105 does not provide the user input within the threshold period of time.

In some examples, the second computing device 150 may be integrated within the article of PPE 110. In such scenarios, the article of PPE 110 includes the user interface 340, the communication module 330, the processing module 310, and the second memory 320.

Figure 4:
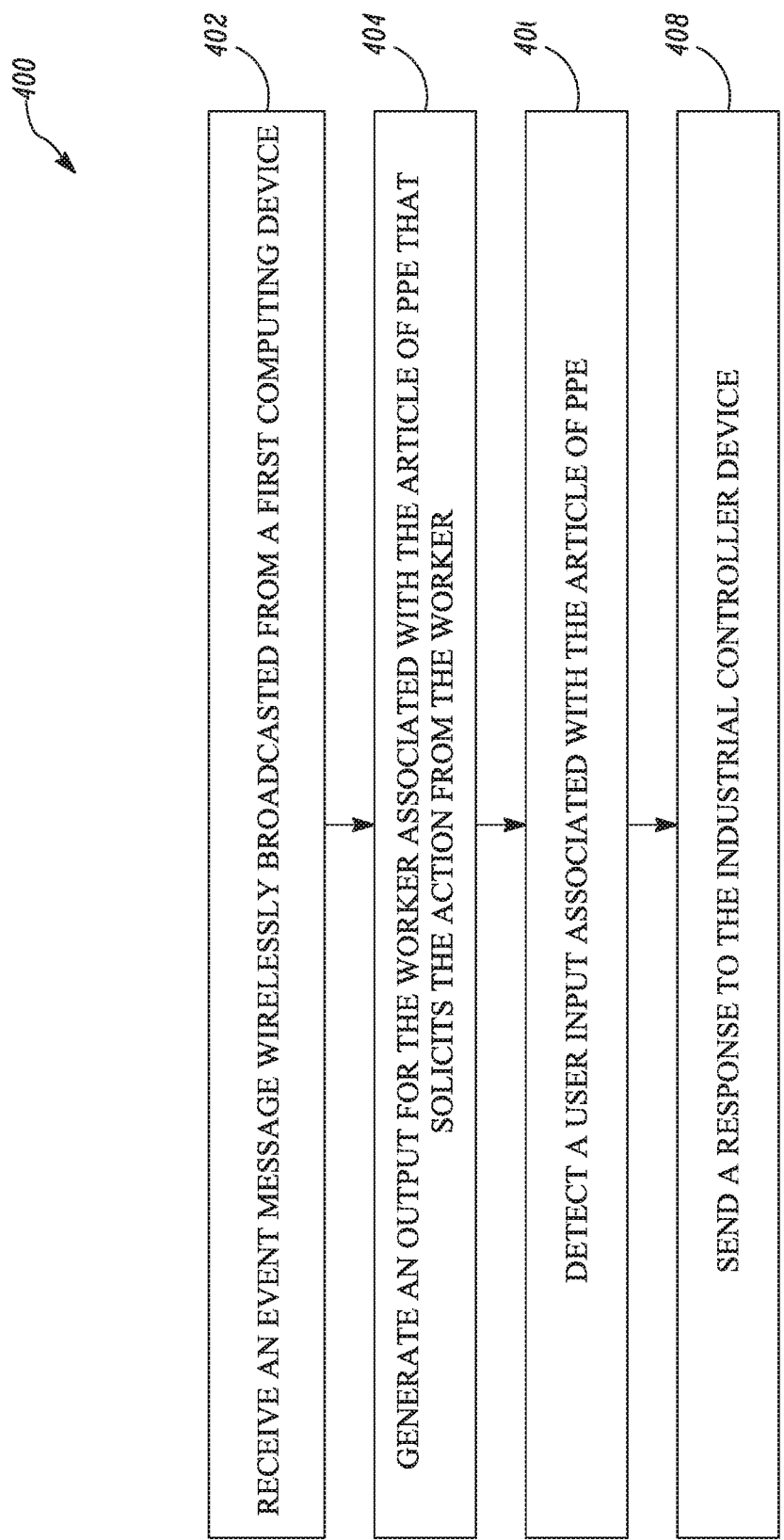
FIG. 4 illustrates example operations that may be performed by one or more computing devices in accordance with techniques of this disclosure.

FIG. 4 is a flow diagram illustrating a method (400) including example operations that may be performed by one or more computing devices in accordance with techniques of this disclosure. For purposes of illustration only, the example operations are described below within the context of a computing device, such as the second computing device 150, as described in this disclosure. In some examples, the second computing device 150 is integrated within the article of PPE 110. The second computing 150 device may receive the event message wirelessly broadcasted from the first computing device 140 (402). The second computing device 150 may generate the output for the worker 105 associated with the article of PPE 110 that solicits the action from the worker 105 (404). The second computing device 150 may detect a user input associated with the article of PPE 110 (406). The second computing device 150 may send a response to the first computing device 140 (408).

In some examples, the event message is sent by the second computing device 150 to another computing device communicatively coupled to a remote article of PPE that is within a range of the second computing device 150 but not in direct communication with the first computing device 140. In some examples, the second computing device 150A and the third computing device 150N are not in direct communication with the first computing device 140. In these examples, the plurality of wireless access points 102A, 102B (shown in FIG. 1), geographically distributed throughout the environment 101, may receive the event message from the first computing device 140 and send the event message to the second computing device 150A and/or the third computing device 150N. In some examples, the event message is wirelessly broadcasted in a dedicated virtual channel for non-audio messaging, wherein the virtual channel is included in a set of virtual channels and the set of virtual channels are each included in a single physical channel.

Although the techniques, systems, and apparatuses of this disclosure have been described with respect to the examples of FIGS. 1-4, such techniques, systems, and apparatuses of this disclosure may be applied, implemented, combined, or otherwise used with techniques, systems, and apparatuses described in PCT Application No. IB2019/055262, entitled "Personal Protective Equipment Safety System Using Contextual Information from Industrial Control Systems", filed on Jun. 21, 2019, which is hereby incorporated by reference herein in its entirety.

In the present detailed description of the examples, reference is made to the accompanying drawings, which illustrate specific examples in which the techniques, systems, and apparatuses of this disclosure may be practiced. The illustrated examples are not intended to be exhaustive of all examples according to the techniques, systems, and apparatuses of this disclosure. It is to be understood that other examples may be utilized, and structural or logical changes may be made without departing from the scope of the techniques, systems, and apparatuses of this disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass examples having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A system comprising:
   an article of personal protective equipment (PPE);
   an industrial controller device that is configured to control an industrial device;
   a first computing device communicatively coupled to the industrial controller device and comprising a first computer processor and a first memory; and
   a second computing device communicatively coupled to the article of PPE and comprising a second computer processor and a second memory;
   wherein the first memory comprises at least one first instruction that, when executed by the first computer processor, causes the first computer processor to, in response to detecting an industrial controller event that corresponds to an abnormality associated with at least one of a temperature, an output rate, a vibration, a sound emission, a component speed, an operating rate, an air hazard level, a sound hazard level, or a radiation level associated with an operation of the industrial device, wirelessly broadcast an event message, based at least in part on the industrial controller event, that solicits an action from a worker, wherein the event message includes (i) severity information associated with the industrial controller event; and (ii) a worker group identifier associated with a work zone that includes a region encompassed by a defined boundary that includes a location of the industrial device;

wherein the second memory comprises at least one second instruction that, when executed by the second computer processor, causes the second computer processor to:
in response to receiving the event message that is wirelessly broadcasted, generate an output for the worker associated with the article of PPE that solicits the action from the worker, wherein one or more characteristics of the output are based on the severity information associated with the industrial controller event; and
in response to detecting a user input associated with the article of PPE, send, based at least in part on the event message and the user input, a response from the second computing device to the first computing device,
wherein the first memory comprises at least one third instruction that, when executed by the first computer processor, causes the first computer processor to, in response to receiving the response from the second computing device, stop operation of the industrial controller device.

2. The system of claim 1, wherein the second computing device is integrated within the article of PPE.

3. The system of claim 1, wherein the second computing device is worn by the worker associated with the article of PPE.

4. The system of claim 1, wherein the event message solicits an acknowledgement from the worker.

5. The system of claim 1, wherein the first computing device clears the industrial controller event if the worker provides the user input.

6. The system of claim 1, wherein the first computing device escalates the industrial controller event if the worker does not provide the user input within a threshold period of time.

7. The system of claim 1, wherein the event message is wirelessly broadcasted in a dedicated virtual channel for non-audio messaging, wherein the virtual channel is included in a set of virtual channels and the set of virtual channels are each included in a single physical channel.

8. The system of claim 1, wherein the event message is sent by the second computing device to a third computing device that is communicatively coupled to another article of PPE, wherein the third computing device is within a range of the second computing device but not in direct communication with the first computing device.

9. The system of claim 1, wherein the first computing device multicasts the event message to multiple articles of PPEs that are subscribed to a particular group.

10. The system of claim 1, wherein the event message includes at least one of an audible indication, a visual indication, and a tactile indication.

11. The system of claim 1, wherein the worker group identifier describes one or more work-related characteristics associated with the worker.

12. The system of claim 1, wherein the abnormality associated with the at least one of the temperature, the output rate, the vibration, the sound emission, the component speed, the operating rate, the air hazard level, the sound hazard level, or the radiation level is not within at least one of a rule, a limit, or a threshold.

13. An article of personal protective equipment (PPE) associated with a worker, the article of PPE comprising:
a user interface configured to receive a user input from the worker;
a communication module communicatively coupled to the user interface, the communication module configured to:
receive an event message wirelessly broadcasted from a first computing device that is communicatively coupled to an industrial controller device, wherein the industrial controller device is configured to control an industrial device, wherein the event message is associated with an industrial controller event that corresponds to an abnormality associated with at least one of a temperature, an output rate, a vibration, a sound emission, a component speed, an operating rate, an air hazard level, a sound hazard level, or a radiation level associated with an operation of the industrial device, wherein the event message solicits an action from the worker, and wherein the event message includes (i) severity information associated with the industrial controller event; and (ii) a worker group identifier associated with a work zone that includes a region encompassed by a defined boundary that includes a location of the industrial device; and
send, based at least in part on the event message and the user input, a response to the first computing device, wherein the first computing device, in response to receiving the response, performs at least one operation associated with the industrial controller device; and
a processing module communicatively coupled to the communication module and the user interface, the processing module configured to:
generate an output for the worker associated with the article of PPE in response to receiving the event message, wherein one or more characteristics of the output are based on the severity information associated with the industrial controller event; and
detect the user input on the user interface from the worker in response to the output.

14. The article of PPE of claim 13, wherein the communication module is configured to wirelessly communicate with the first computing device using at least one of Bluetooth, cellular communications network, and Wi-Fi.

15. The article of PPE of claim 13, wherein the event message solicits an acknowledgement from the worker.

16. The article of PPE of claim 13, wherein the event message is sent to a remote article of PPE that is within a range of the article of PPE but not in direct communication with the first computing device.

17. The article of PPE of claim 13, wherein the abnormality associated with the at least one of the temperature, the output rate, the vibration, the sound emission, the component speed, the operating rate, the air hazard level, the sound hazard level, or the radiation level is not within at least one of a rule, a limit, or a threshold.

18. A method comprising:
receiving, by a second computing device communicatively coupled to an article of personal protective equipment (PPE), an event message wirelessly broadcasted from a first computing device that is communicatively coupled to an industrial controller device, wherein the industrial controller device is configured to control an industrial device, wherein the event message is associated with an industrial controller event that corresponds to an abnormality associated with at least one of a temperature, an output rate, a vibration, a sound emission, a component speed, an operating rate, an air hazard level, a sound hazard level, or a radiation level associated with an operation of the industrial device, wherein the event message solicits an action from a worker associated with the article of PPE, and wherein the event message includes (i) severity information associated with the industrial controller event; and (ii) a worker group identifier associated with a work zone that includes a region encompassed by a defined boundary that includes a location of the industrial device;

generating, by the second computing device, an output for the worker associated with the article of PPE that solicits the action from the worker, wherein one or more characteristics of the output are based on the severity information associated with the industrial controller event;

detecting, by the second computing device, a user input associated with the article of PPE; and sending, by the second computing device, based at least in part on the event message and the user input, a response to the first computing device, wherein the first computing device, in response to receiving the response, stop operation of the industrial controller device.

19. The method of claim 18, wherein the second computing device is integrated within the article of PPE.

20. The method of claim 18, wherein the event message solicits an acknowledgement from the worker.

21. The method of claim 18, wherein the abnormality associated with the at least one of the temperature, the output rate, the vibration, the sound emission, the component speed, the operating rate, the air hazard level, the sound hazard level, or the radiation level is not within at least one of a rule, a limit, or a threshold.

* * * * *